June 24, 1969  R. J. PATTERSON  3,451,794
METHOD FOR MELT-CASTING INFRARED TRANSMITTING GLASSES
Filed April 29, 1966
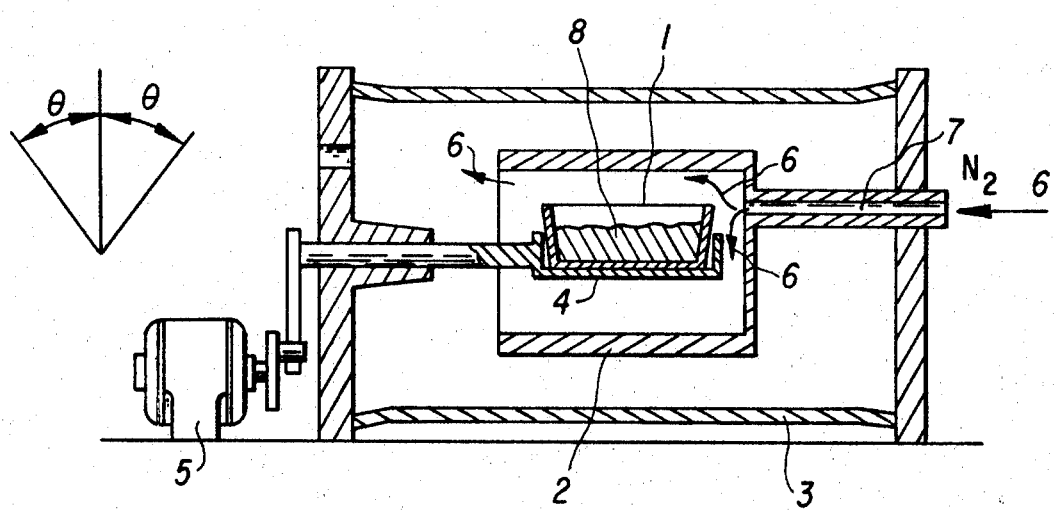
INVENTOR
Robert Joe Patterson
BY
ATTORNEY United States Patent Office 3,451,794
Patented June 24, 1969

3,451,794
METHOD FOR MELT-CASTING INFRARED
TRANSMITTING GLASSES
Robert Joe Patterson, Dallas, Tex., assignor to Texas
Instruments Incorporated, Dallas, Tex., a corporation
of Delaware
Filed Apr. 29, 1966, Ser. No. 546,295
Int. Cl. C03b 19/06
U.S. Cl. 65—18                                                    1 Claim

ABSTRACT OF THE DISCLOSURE

Disclosed is a method of casting infrared transmitting glass including the steps of rocking a container having heated glass contained therein to average the material composition of the glass to create glass which is substantially free of optical inhomogeneities and simultaneously directing a gas flow across the surface of the glass during the rocking to cause the glass to be substantially free of absorption bands producing oxides.

This invention pertains to glass fabrication and more particularly to the casting of infrared transmitting glasses into optical blanks.

Detection systems responsive to light waves in the infrared region are today being developed more and more for military and civilian usage. As a result, the transmission of information via the infrared region of the energy spectrum has received increasing attention in recent years. For example, a variety of infrared detection systems has been developed for aircraft applications, composed generally of a detector having a responsive element sensitive to infrared energy and a transmitting element such as a lens or dome which, in addition to intercepting infrared rays at various angles of incidence and focusing them upon the responsive element of the detector, provides physical protection of the detecting element from its operating environment.

The fabrication of such lenses or domes generally involves three basic steps. First, various atomic percents materials are combined to form pieces of glass of the desired constitution. One such technique involves placing the appropriate amounts of the various glass constituents into evacuated quartz ampoules, heating the ampoules to a very high temperature so that the elements therein react completely with each other, and then cooling the reaction mixtures to room temperature, resulting in pieces of glass having the desired final composition. Second, the pieces of glass are then cast or formed into optical blanks of required sizes and shapes. Third, the blanks are then fabricated into the lenses or domes. In addition to providing blanks of particular shapes and sizes, the casting technique utilized must provide good quality blanks with uniform physical and optical characteristics throughout.

A number of infrared transmitting glasses composed of the elements from the Groups IV–A, V–A and VI–A have been fabricated having excellent physical, chemical, and optical properties for use in the infrared region. However, prior techniques, for casting these glasses by melting the pieces of glass and forming them into desired sizes and shapes have presented several disadvantages. First, inhomogeneities in the finished blank have been produced due to composition changes of the material during the melting phase, resulting in striations of material having slightly different optical properties. Second, during the melting of the glass prior to its formation or casting into the desired size and shape, decomposition of the constituent material results in a volatile specie of material which vaporizes and solidifies on surfaces above the melt. This solidified material, usually insoluble, often falls back into the melt, thereby introducing inclusions into the finally cast optical blank. Third, the molten glass is ordinarily reactive, trace quantities of oxygen in the casting system resulting in the formation of oxides which produce undesirable absorption bands in the final lens or dome structure.

It is therefore an object of the invention to provide a method for melt-casting glasses into optical blanks for lenses or domes which are substantially free of optical inhomogeneities, inclusions introduced as insoluble solid foreign matter, and absorption-band producing oxides. It is another object of the invention to provide an improved method for melt-casting infrared transmitting glasses composed of the elements from the Groups IV–A, V–A and VI–A.

In accordance with these and other objects, features and advantages thereof, the present invention comprises an improved method for melt-casting optical blanks of infrared transmitting glasses. Accordingly, various size pieces of infrared transmitting glass of desired composition are placed in a crucible of desired shape and size and the crucible then placed in a furnace chamber. The chamber is purged free of oxygen and an oxygen-free gas, such as nitrogen, is directed across the top surface of the crucible at a prescribed velocity. The temperature of the furnace is raised in order to melt the pieces of glass, and the crucible is rocked through a suitable angle at a prescribed rate. The molten material is then quick-cooled to a lower temperature, followed by an annealing cooling to a still lower temperature, resulting in an optical blank whose upper surface is normally flat and whose bottom surface has the shape of the crucible. The mixing of the molten material by rocking the crucible through the suitable angle at a prescribed rate averages the material composition of the melt and substantially eliminates any optical inhomogeneities in the finished blank. The continuous flow of gas across the top surface of the crucible and thus the surface of the melt removes condensible vapors escaping from the melt, and preventing a buildup of solids above the melt which would fall into the melt to cause the inclusions. In addition, the gas flow, being an oxygen-free gas, sweeps out any oxygen thereby preventing the formation of oxides in the final blank structure and substantially eliminating any absorption bands due to the presence of the oxides.

The novel features believed characteristic of this invention are set forth in the appended claims. The invention itself, however, as well as other objects and advantages thereof may best be understood by reference to the following detailed description, read in conjunction with the accompanying drawing which illustrates one form of casting apparatus utilized for practicing the invention.

Referring to the sole figure of the drawing, the apparatus utilized comprises a fused quartz crucible 1, a gas tight chamber 3 in which the crucible 1 and its contents are heated, a furnace 2 designed to allow close control of both heating and cooling, a rocking mechanism comprised of a pan 4 linked to a motor drive 5 for rocking the crucible 1 through a suitable angle $\theta$ at a prescribed rate, and a gas line 7 directing a flow of gas 6, in this example, nitrogen ($N_2$), across the surface of the crucible 1. All construction materials, including the furnace, are of a metal and/or glass that prevents introduction of oxygen in the system by outgassing. The sides of the crucible 1 are slightly tapered to allow for easy release of the cast blank as required. Although the casting process to be described is applicable for forming blanks of various compositions, it is particularly suited for glasses composed of the elements from Groups IV–A, V–A, and VI–A. The invention will thus be described with reference to the formation of infrared glasses having the composition $Ge_xSb_ySe_z$ where $x+y+z=100$ atomic percent.

Various processes may be used to form pieces of infrared transmitting glass having this composition, those pieces then being melt-cast according to the invention. An example of one such process is described in copending U.S. patent application, Ser. No. 449,994, filed Apr. 22, 1965, now Patent No. 3,360,649 issued Dec. 26, 1967, and assigned to the assignee of the present application. According to this process, various atomic percentages of germanium, antimony and selenium are chosen for the sample to be made. Appropriate amounts of the constituents are weighed and placed in a previously cleaned quartz ampoule, the ampoule being evacuated to about $10^{-4}$ torr and sealed. The sealed tube is then placed in a furnace and gradually heated to a temperature of about 800° C. to 900° C. and held at that temperature for about 16 hours to provide sufficient time for the constituents to react completely with each other. The sample is then removed from the furnace and air quenched to room temperature. As a consequence of this process, a piece of infrared transmitting glass of the composition $Ge_xSb_ySe_z$ is formed and ready to be cast.

This piece of glass (along with others similarly made) which are to be melt-cast are first rinsed in methanol, air dried and then placed in the crucible 1. It is desirable to use as large pieces of the glass as possible. The crucible with its contents is then inserted in the chamber 3 and within the furnace 2. The chamber 3 and the furnace 2 are then evacuated to purge them of oxygen by any suitable means and a flow of nitrogen gas 6 is directed across the top surface of the crucible at a desired velocity. The furnace 2 is brought to a high temperature rapidly melting the glass pieces within the crucible 1. During the melting operation, the crucible 1 is rocked through a suitable angle $\theta$ at a prescribed rate. Mixing by rocking should continue throughout the heating period. The resulting melt 8 is then quick-cooled to a lower temperature, and then slow-cooled to a still lower temperature to provide annealing.

The flow of nitrogen gas 6 across the surface of the melt within the crucible must have a velocity sufficiently high to continually remove the condensible vapors escaping from the melt, and yet not be excessively high to cool the melt. The mixing of the melt 8 by rocking requires the determination of a suitable rocking angle and rocking rate. Since the mixing should be vigorous, the greatest mixing angle $\theta$ allowable is considered best. For deeper (thicker) melts, larger angles are required while shallower and wider melts permit lower angles of rocking. The rate of rocking depends upon the viscosity of the melt at the particular temperature as well as the crucible geometry. Rocking rates at from 110 to 190 cycles per minute have proven desirable.

As an example of typical conditions for the casting of glass having the composition $Ge_{28}Sb_{12}Se_{60}$, large pieces of this glass, approximately 20–50 grams by weight, were placed in the crucible 1 and inserted in the furnace 2 within the chamber 3. The nitrogen flow is directed across the crucible at a linear velocity of approximately 4 inches per minute. The furnace was brought to a temperature of 580° C. (plus or minus 5° C.) as rapidly as possible and held at that temperature for approximately 10 minutes. The mixing of the melt by rocking began when the furnace was at 580° C. and continued throughout the 10 minute period. When the dimensions of the melt 8 were 2.6 inches in diameter and 0.4 inch in depth, the rocking angle $\theta$ was maintained at 15° off center (total angle of 30°), and the rocking rate was maintained at 112 cycles per minute. At the end of the 10 minute period, the melt was cooled rapidly from 580° C. to 340° C. (plus or minus 20° C.) at a rate of 10° per minute or slightly greater. The melt was then allowed to cool from 340° C. to about 285° C. and was then annealed by slow cooling to 50° C. at a maximum rate of 3° C. per minute. The resultant optical blank was then removed from the crucible, the bottom surface having the shape of the crucible 1 and the upper surface being flat and having somewhat of a mirror finish. Investigation of this blank showed an absence of inhomogeneities or inclusions and an oxygen contact of less than 3 p.p.m. (0) by weight.

Although the present invention has been described with respect to the fabrication of infrared transmitting glasses composed of elements from Group IV–A, V–A, VI–A, and particularly to the composition $Ge_{28}Sb_{12}Se_{60}$, the casting process is equally applicable to the fabrication of optical blanks for lenses or domes having other material compositions, particularly those materials which are only moderately volatile at melt temperatures and therefore have only slight decomposition during the melt-casting process.

What is claimed is:

1. A melt-casting technique for $Ge_{28}Sb_{12}Se_{60}$ infrared transmitting glass, comprising the steps of:
    (a) forming pieces of glass having the composition of $Ge_{28}Sb_{12}Se_{60}$,
    (b) placing said pieces of glass into a crucible,
    (c) heating said pieces of glass in said crucible to approximately 580° C. to form a melt of molten glass from said melt,
    (d) rocking said crucible during said heating through a total angle of approximately 30° and at a rate of from approximately 110 to 190 cycles per minute to average the material composition of said melt,
    (e) directing a flow of nitrogen gas across the surface of said melt at a linear velocity of approximately 4 inches per minute, thereby to remove condensable vapors escaping from said melt,
    (f) quick cooling said melt from approximately 580° C. to approximately 340° C. at a rate of approximately 10° per minute,
    (g) cooling said melt from approximately 340° C. to approximately 285° C., and
    (h) slow cooling said melt to approximately 50° C. at a maximum rate of 3° per minute.

References Cited

UNITED STATES PATENTS 2,886,491   5/1959   Jerger et al. _____ 65—62 XR
3,209,641   10/1965  Upton _____ 65—181 XR
3,222,142   12/1965  Shell et al.

S. LEON BASHORE, *Primary Examiner.*

FRANK W. MIGA, *Assistant Examiner.*

U.S. Cl. X.R.

65—32, 33, 66, 71, 157, 144, 302; 106—470; 264—71, 85